(12) United States Patent
Gregor

(10) Patent No.: US 10,108,205 B2
(45) Date of Patent: Oct. 23, 2018

(54) METHOD AND SYSTEM FOR CONTROLLING A FLOW RATIO CONTROLLER USING FEED-FORWARD ADJUSTMENT

(71) Applicant: Applied Materials, Inc., Santa Clara, CA (US)

(72) Inventor: Mariusch Gregor, Gilroy, CA (US)

(73) Assignee: Applied Materials, Inc., Santa Clara, CA (US)

( * ) Notice: Subject to any disclaimer, the term of this patent is extended or adjusted under 35 U.S.C. 154(b) by 435 days.

(21) Appl. No.: 13/971,618

(22) Filed: Aug. 20, 2013

(65) Prior Publication Data

US 2015/0005956 A1 Jan. 1, 2015

Related U.S. Application Data

(60) Provisional application No. 61/841,179, filed on Jun. 28, 2013.

(51) Int. Cl.
*G05D 7/06* (2006.01)
(52) U.S. Cl.
CPC .................. *G05D 7/0664* (2013.01)
(58) Field of Classification Search
CPC ................................ G05D 7/0664
See application file for complete search history.

(56) References Cited

U.S. PATENT DOCUMENTS 4,489,375 A    12/1984   Putman
4,955,216 A *   9/1990   Barker .................... B21B 37/74
                                                      72/13.4
5,170,438 A    12/1992   Anger
5,410,495 A     4/1995   Ramamurthi
6,006,546 A *   12/1999   Espie ................... F25J 3/04412
                                                      62/656

(Continued)

FOREIGN PATENT DOCUMENTS

| JP | 2007058635 | 3/2007 |
| KR | 101181996 | 11/2011 |
| KR | 20110128427 | 11/2011 |

OTHER PUBLICATIONS

International Preliminary Report on Patentability for PCT/US2014/043947 dated Jan. 7, 2016, 7 pages.

(Continued)

*Primary Examiner* — Kenneth M Lo
*Assistant Examiner* — David J Wynne
(74) *Attorney, Agent, or Firm* — Lowenstein Sandler LLP

(57) ABSTRACT

A processing device determines a plurality of initial flow setpoint commands, each of the plurality of setpoint commands corresponding to one of a plurality of valves, and sends each of the plurality of initial setpoint commands to a corresponding one of the plurality of valves. The processing device monitors the plurality of valves for a flow condition requiring and adjustment. Upon detecting the flow condition, the processing device predicts the adjustment based on previous setpoints, and determines a plurality of updated flow setpoint commands, each of which corresponds to one of the plurality of valves based on the the predicted adjustment. The processing device then sends each of the plurality of updated setpoint commands to the corresponding one of the plurality of valves.

20 Claims, 9 Drawing Sheets

(56) References Cited

U.S. PATENT DOCUMENTS

| | | | |
|---|---|---|---|
| 6,050,283 A * | 4/2000 | Hoffman | G05D 11/135 137/3 |
| 6,174,738 B1 | 1/2001 | Steffan et al. | |
| 6,389,364 B1 | 5/2002 | Vyers | |
| 6,675,771 B2 * | 1/2004 | Pursifull | F02D 11/105 123/361 |
| 7,243,035 B2 | 7/2007 | Tison | |
| 7,706,925 B2 | 4/2010 | Ding | |
| 8,079,383 B2 | 12/2011 | Ding | |
| 8,321,060 B2 | 11/2012 | Smirnov | |
| 2002/0042205 A1 * | 4/2002 | McMillin | C23F 4/00 438/710 |
| 2002/0114732 A1 | 8/2002 | Vyers | |
| 2002/0189682 A1 | 12/2002 | Linthorst | |
| 2004/0187928 A1 | 9/2004 | Ambrosina et al. | |
| 2005/0056079 A1 * | 3/2005 | Nagy | G01N 33/0006 73/1.07 |
| 2005/0098906 A1 | 5/2005 | Satoh | |
| 2005/0112542 A1 * | 5/2005 | West | C12M 41/48 435/3 |
| 2005/0223813 A1 | 10/2005 | Lull et al. | |
| 2006/0237063 A1 | 10/2006 | Ding | |
| 2009/0061541 A1 | 3/2009 | Moriya | |
| 2010/0078128 A1 | 4/2010 | Yamada | |
| 2010/0229965 A1 | 9/2010 | Kashima et al. | |
| 2010/0292825 A1 * | 11/2010 | Taylor | C25C 3/06 700/108 |
| 2011/0093133 A1 * | 4/2011 | Turney | F25B 1/053 700/300 |
| 2011/0231114 A1 * | 9/2011 | Roys | G01F 15/063 702/45 |
| 2012/0000542 A1 * | 1/2012 | Eto | G05D 7/0623 137/10 |
| 2012/0186655 A1 * | 7/2012 | Smirnov | G05D 7/0635 137/1 |
| 2012/0197446 A1 * | 8/2012 | Glaudel | G05D 7/0635 700/282 |
| 2013/0085618 A1 * | 4/2013 | Ding | C23C 16/45561 700/282 |
| 2014/0294559 A1 | 10/2014 | Holcomb et al. | |

OTHER PUBLICATIONS

International Search Report and Written Opinion for PCT/US2014/043945 dated Oct. 28, 2014, 11 pages.

PCT Search Report & Written Opinion, RE: Application #PCT/US2014043945 dated Oct. 28, 2014, 9 pages.

* cited by examiner

METHOD AND SYSTEM FOR CONTROLLING A FLOW RATIO CONTROLLER USING FEED-FORWARD ADJUSTMENT

CROSS-REFERENCE TO RELATED APPLICATIONS

The present application is related to and claims the benefit of U.S. Provisional Patent Application Ser. No. 61/841,179, filed Jun. 28, 2013, which is hereby incorporated by reference. The present application is related to co-filed U.S. patent application Ser. No. 13/971,485, entitled METHOD AND SYSTEM FOR CONTROLLING A FLOW RATIO CONTROLLER USING FEEDBACK, which is assigned to the assignee of the present application.

TECHNICAL FIELD

Embodiments of the present disclosure relate to flow ratio controllers, and more particularly, to management of mass flow controllers.

BACKGROUND

Gas delivery systems for semiconductor processing chambers utilize flow splitting methods to improve mix ratio accuracy, repeatability, and reproducibility in multi-injection point or shared chamber architectures. Flow splitting can reduce costs of a gas delivery system significantly in a number of applications. The flow ratio controller (FRC) can be an effective flow splitting device, but is generally very complex.

FRCs are widely used in semiconductor industries to distribute gas or gas mixtures to different zones in a process chamber. However, FRCs often utilize algorithms that create a non-symmetric condition in order to achieve desired new setpoints in the fastest way possible at the expense of symmetric transient flow. Additionally, FRCs are often limited in number of channels and flow range, preventing scalability without incurring high costs. Further, control architecture is contained within the device, limiting the device to point of use control.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
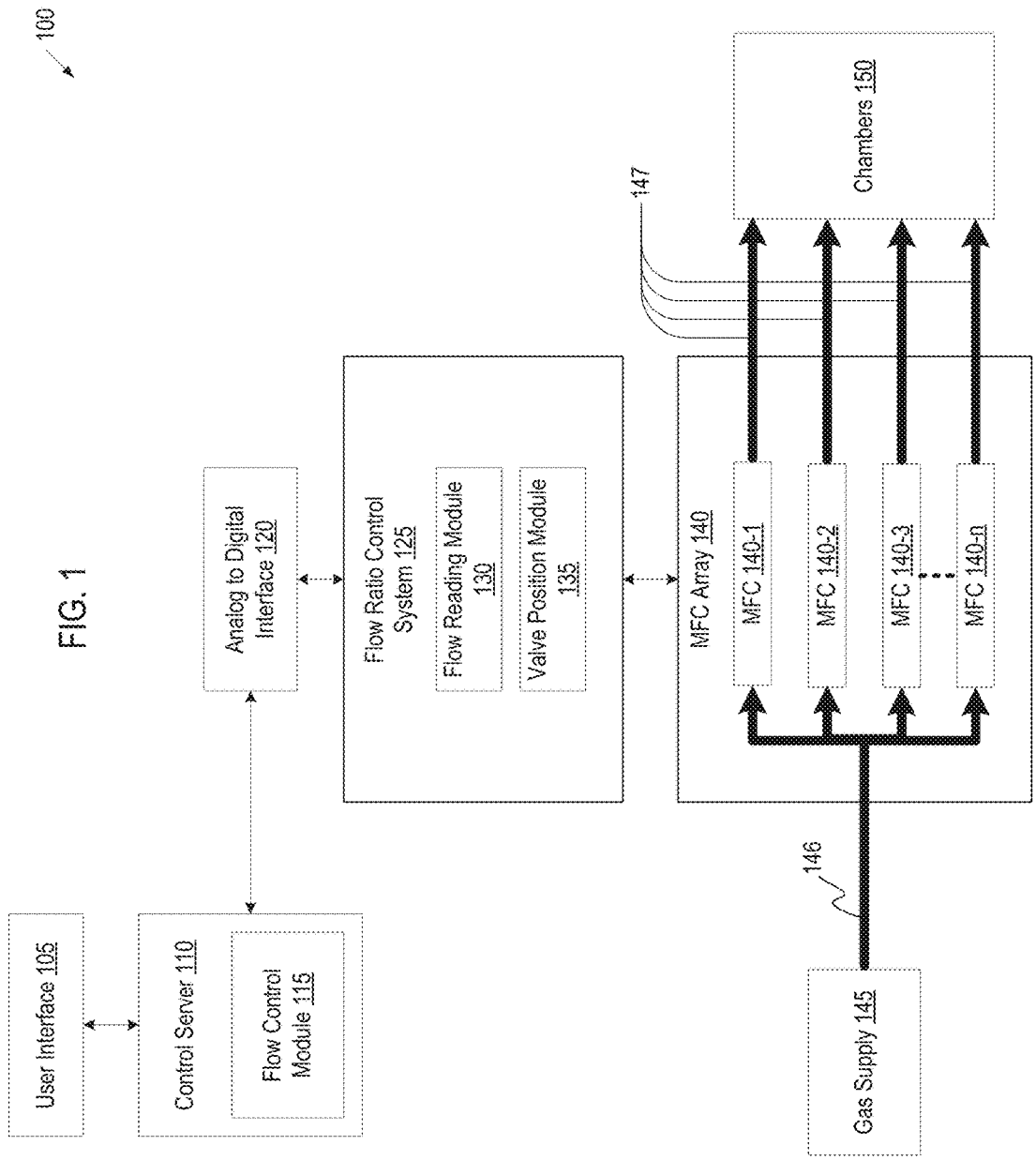
FIG. 1 is a block diagram illustrating a flow control system utilizing a feedback driven flow control module coupled to a multi-channel mass flow control apparatus via an analog connection in accordance with one embodiment.

Embodiments of the disclosure are directed to a method and system for regulating a multi-channel flow ratio controller (FRC) using an array of two or more mass flow controller (MFC) devices. The MFC devices operate in parallel to each other and constitute the Flow Ratio Controller channels, with one MFC per channel. The array of MFC devices receive a gas from a gas supply and direct it toward a gas chamber or specified zones within a gas chamber. The MFC device can be any suitable industry standard mass flow controller. The array of MFC devices is managed by a Flow Ratio Control System that processes signals to and from the individual MFC devices. The signals can include voltage measurements indicating total flow rate as well as valve position for each individual MFC. The Flow Ratio Control System sends these measurements to a Control Server for processing. The Control Server receives the measurements from each individual MFC in the array and executes a control algorithm to implement any changes to the overall flow of gas through the array.

Unlike conventional FRCs, embodiments are easily scalable to any number of channels over a flow range from about 10 standard cubic centimeters per minute (sccm) to about 200 standard liters per minute (slm), allowing freedom of gas panel design. Unlike FRCs that create non-symmetric flow conditions when altering flow setpoints, embodiments provide control that is inherently stable and symmetric across channels at a lower cost. Embodiments divide the total gas flow across channels such that the pressure drop during flow adjustments is minimized, while keeping valves as open as possible.

When the terms "about" and "approximately" are used herein, these are intended to mean that the nominal value presented is precise within ±10%. Additionally, when the term "recipe" is used herein, it is intended to refer to a particular combination of flow and/or valve setpoints that are spread across an MFC array to achieve a desired total flow. Similarly, the term "recipe control algorithm" is intended to refer to the processing logic that is responsible for maintaining a predetermined flow "recipe."

In one embodiment, the MFC array can be driven in a flow setpoint mode in which the system sends a flow setpoint command to each MFC each communication cycle. The flow setpoint command is a function of flow ratio, measured total flow, and MFC valve voltage. The Flow Ratio Control System evaluates the flow and valve voltage from each MFC. This information can be sent to the Control Server where an updated flow setpoint is calculated for each MFC in a real-time closed feedback loop. In embodiments, the Flow Ratio Control System sends commands to and receives signals from each MFC via an analog connection. In embodiments, the Flow Ratio Control System communicates with the Real-Time System via a digital connection by way of an analog to digital interface. In one embodiment the digital connection can be a high speed Ethercat connection.

In another embodiment, the MFC array can be driven in a feed-forward control mode. In this embodiment, the MFCs in the array can support a direct digital connection, such as a high speed Ethercat connection, without the need for an analog to digital interface. The use of a digital connection can provide the ability to send and receive larger amounts of data and control measurements between the Flow Ratio Control System and the Control Server. The Flow Ratio Control System can therefore communicate with the Control Server much more quickly and with much greater accuracy. In embodiments, after receiving flow and voltage information from the Flow Ratio Control System, the Control Server can break from the closed feedback loop and send commands directly to each of the MFCs. In one embodiment, the Control Server can send a fixed MFC flow setpoint directly to each MFC, bypassing the feedback control logic in the Control Server. In another embodiment, the Control Server can send an MFC valve position setpoint directly to each MFC.

In feed-forward embodiments, previous setpoints used by the Flow Ratio Control System can be stored in a data store. The Control Server can use the data store to predict correct flow and/or valve setpoints for specific flow conditions encountered within the Flow Ratio Control System. When unstable flow conditions are detected that can have been encountered in the past, the Control Server can select a setpoint that was successfully implemented to correct the prior condition. The Control Server can then send an updated setpoint command directly to the MFC array without accessing the feedback control logic. For example, if a process recipe step causes a transient flow instability within the MFC array, the flow setpoints used for each channel to correct the problem can be saved to the data store and used to eliminate similar instabilities encountered in the future. If the same or a similar flow instability is encountered at a later time, the Control Server can access the data store to predict a series of flow setpoints that will lead to a flow correction.

FIG. 1 is a block diagram illustrating a flow control system 100 utilizing a feedback driven flow control module coupled to a multi-channel mass flow control apparatus via an analog connection, in which embodiments described herein can operate. The flow control system 100 can include a user interface 105, a control server 110, a flow ratio control system 125, and an MFC Array 140. The control server 110 can be coupled to the flow ratio control system 125 via an analog to digital interface 120 that provides analog to digital communication. Flow ratio control system 125 can receive analog signals from and send analog signals to an array of mass flow controllers MFC 140-1 to MFC 140-n where n represents the total number of mass flow controllers in any embodiment. For example, in one embodiment the total number of mass flow controllers can be 2. In another embodiment, the total number of mass flow controllers can be 10. Each MFC 140-1 to MFC 140-n receives an input flow of gas 146 from gas supply 145 and produces an output flow of gas 147 directed to chambers 150.

The user interface 105, control server 110, and flow ratio control system 125 can be individually hosted by any type of computing device including server computers, gateway computers, desktop computers, laptop computers, tablet computer, notebook computer, PDA (personal digital assistant), mobile communications devices, cell phones, smart phones, hand-held computers, or similar computing device. Alternatively, any combination of user interface 105, control server 110, and flow ratio control system 125 can be hosted on a single computing device including server computers, gateway computers, desktop computers, laptop computers, mobile communications devices, cell phones, smart phones, hand-held computers, or similar computing device.

User interface 105 can be variously configured with different functionality to enable a user to provide input to the control server 110. Additionally, the user interface 105 can be configured to provide information to a user regarding status of the control server 110. In one embodiment, the user interface 105 can display the desired total flow recipe, the current total flow readings, the individual errors for any MFC, the total error for the MFC array, or any combination thereof. In another embodiment, the user interface 105 can be used to terminate flow operations through the MFC array 140.

The control server 110 can execute resource intensive algorithms for implementation and adjustment of a flow recipe based on feedback received from the flow ratio control system 125 regarding the status of any or all of the MFC array 140. In one embodiment, control server 110 can include a flow control module 115.

The flow control module 115 can handle processing involved in the calculation of any or all components of the flow recipe. In one embodiment, the flow control module 115 can send a flow setpoint command to each MFC 140 controlled by the flow ratio control system 125. In one embodiment, a flow setpoint command for each MFC can be based on a flow percentage, an initial total flow measurement, and an initial valve voltage measurement. Flow and valve voltage readings (or measurements) from each MFC can then be sent back to the flow control module 115 where the flow recipe is evaluated. An updated flow setpoint can then be calculated for each MFC in a real-time closed feedback loop. The updated flow setpoint can then be sent to the flow ratio control system 125 to adjust the individual MFCs in the MFC array 140.

The control server 110 can communicate with the flow ratio control system 125 via a high speed digital connection coupled to an analog to digital interface 120. Some MFC technology only supports analog signal input and output whereas the control server 110 can support digital input and output over high speed connections such as Ethercat. The analog to digital interface 120 provides connectivity between the analog MFC array 140 and the control server 115. In one embodiment, the analog to digital interface 120 can be a CIOC Interface that translates analog input and output to into Ethercat input and output, utilizing high resolution analog-to-digital and digital-to-analog conversion.

The flow ratio control system 125 can handle processing involved in measurement of flow readings and valve positions of each of the MFCs in the MFC array 140. The flow ratio control system 125 can include a flow reading module 130 and a valve position module 135. In one embodiment, flow reading module 130 receives a valve voltage reading from each individual MFC in the MFC array 140 that is indicative of the total flow of that individual MFC. Flow reading module 130 then sends the total flow reading to control server 110 to be used in the recipe control algorithm. In one embodiment, valve position module 135 receives a voltage reading from each MFC in the MFC array 140 that is indicative of the valve position of that individual MFC. Valve position module 135 then sends the valve position reading to control server 110 to be used in the recipe control algorithm.

Additionally, flow ratio control system 125 can send updated setpoint commands to each of the MFCs in the MFC array 140. If flow control module 115 determines that a change in flow is required, control server 110 can send updated flow setpoint commands to the MFC array 140 via flow ratio control system 125. Similarly, if flow control module 115 determines that a change in valve position is required, control server 110 can send updated valve position setpoint commands to the MFC array 140 via flow control ratio system 125.

Figure 2:
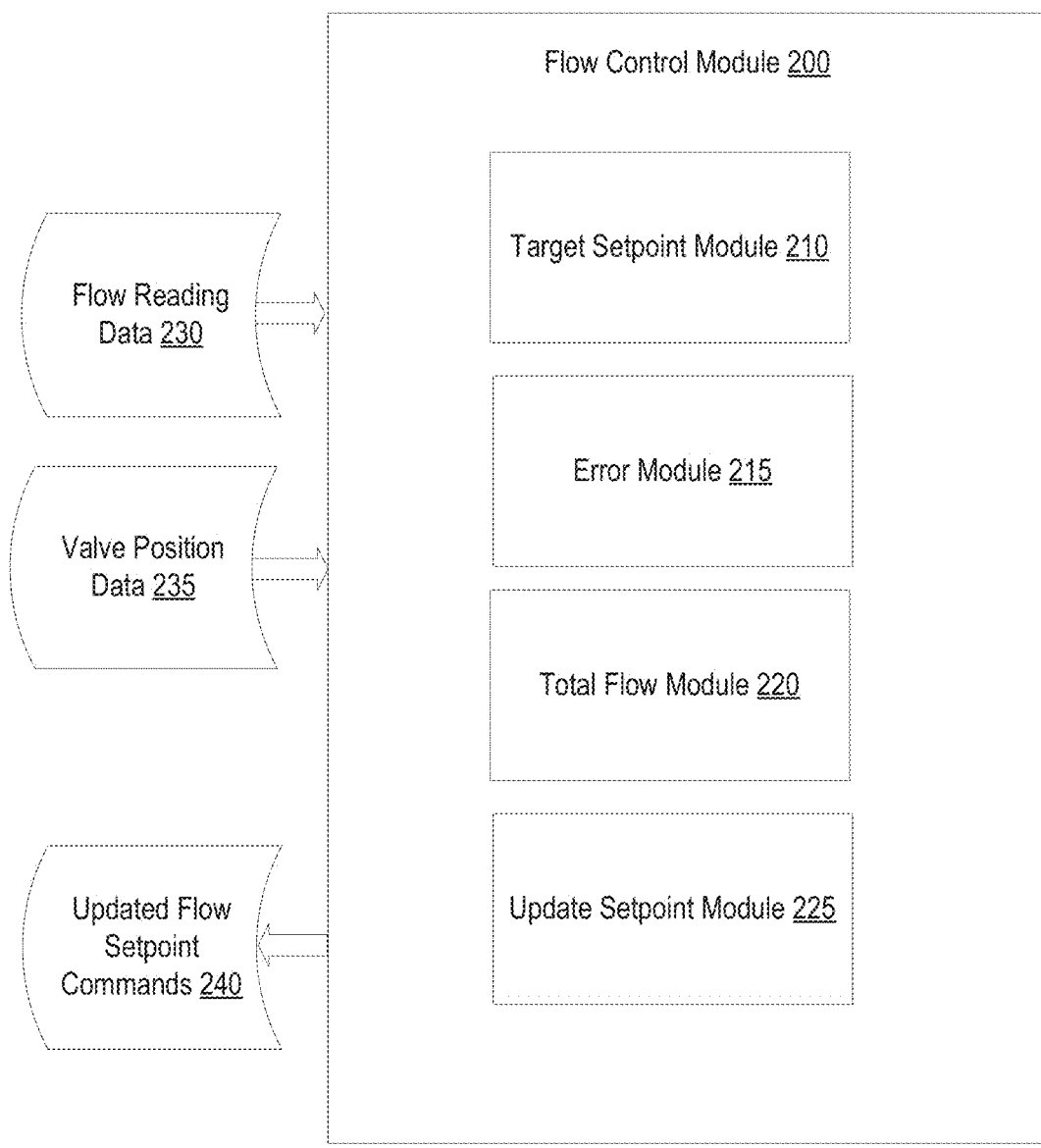
FIG. 2 is a block diagram of one embodiment of a flow control module.

FIG. 2 is a block diagram of one embodiment of a flow control module 200, which can correspond to the flow control module 115 of FIG. 1. The flow control module 200 can include one or more of a target setpoint module 210, an error module 215, a total flow module 220, and an update setpoint module 225. Additionally, flow control module 200 can receive flow reading data 230 and valve position data 235, as well as transmit updated flow setpoint commands 240.

Target setpoint module 210 is configured to determine a reference threshold for valve voltage for each MFC of the MFC array 140. The reference threshold represents a target valve voltage to which each MFC valve can be driven so that pressure drops are minimized during transient flows. In one embodiment, the target setpoint module 210 utilizes a setpoint representing the point at which a valve is as far open as possible and reduces that setpoint until the target reference threshold is achieved. In one embodiment, the target setpoint module 210 calculates the target voltage and represents that value as Vmax.

Error module 215 is configured to determine the difference between the target voltage Vmax from setpoint module 210 and an individual valve voltage of each MFC in the MFC 140 array 140. The individual valve voltage of each MFC in the MFC array 140 can be received as valve position data 235 from the flow ratio control system 125 from FIG. 1.

Error module 215 calculates a value $dV_i = V_{imax} - V_i$, where i represents a particular MFC in the MFC array, Vimax represents the Vmax for that MFC, and Vi represents the actual voltage for that MFC. If the dVi value is positive (that is, if the actual valve voltage is less than the maximum threshold), it represents the error for that MFC. If the dVi value is negative (that is, if the actual valve voltage exceeds the maximum threshold), error module 215 calculates the error as a function of the dVi. Utilizing the function permits adding additional weight to the error factor such that the error becomes exponentially larger in order to drive the valve back at a higher rate. In various embodiments, the function can use a proportional factor, an exponential factor, or a polynomial factor.

Error module 215 then sums the Vimax values for the MFCs in the MFC array to determine a total error for the MFC array. In one embodiment, the error can be represented as e.

Total flow module 220 is configured to determine the desired total flow for the MFCs in the MFC array. Total flow module 220 first calculates a total gain across the MFC's in the MFC array. In one embodiment, the total gain is represented as P. The total gain is determined as a ratio of the total flow readings across the MFCs in the MFC array. Total flow module 220 can employ a gain table from which it interpolates the actual gain as a function of actual flow and actual ratio at a particular point in time. In one embodiment, the total flow of the MFCs in the MFC array can be received as flow reading data 230 from the flow ratio control system 125 from FIG. 1. In one embodiment, the total flow is represented as QRd. Total flow module 220 then calculates a desired total flow as a product of QRd and the error calculated in error module 215. In one embodiment, desired total flow is represented as Q-tot. Thus, $Q\text{-}tot = QRd * e$. In one embodiment, the total flow cannot exceed the maximum value for the MFC devices used in the MFC array.

Update setpoint module 225 is configured to determine a new setpoint for each MFC in the MFC 140 array based on existing flow conditions compared with the desired total flow. Update setpoint module 225 multiplies the desired total flow Q-tot from total flow module 220 with a pre-defined setpoint ratio for each MFC in the MFC array. For example, if an MFC array is composed of 4 MFCs with flow ratios of 10%, 20%, 30% and 40% respectively, update setpoint module 225 will multiply the Q-tot derived in total flow module 220 with the ratio for each of the 4 MFCs to determine the new setpoint for each of the 4 MFCs. In one embodiment, update setpoint module 225 can then send the updated setpoints to the MFCs in the MFC array as updated flow setpoint commands 240.

Figure 3:
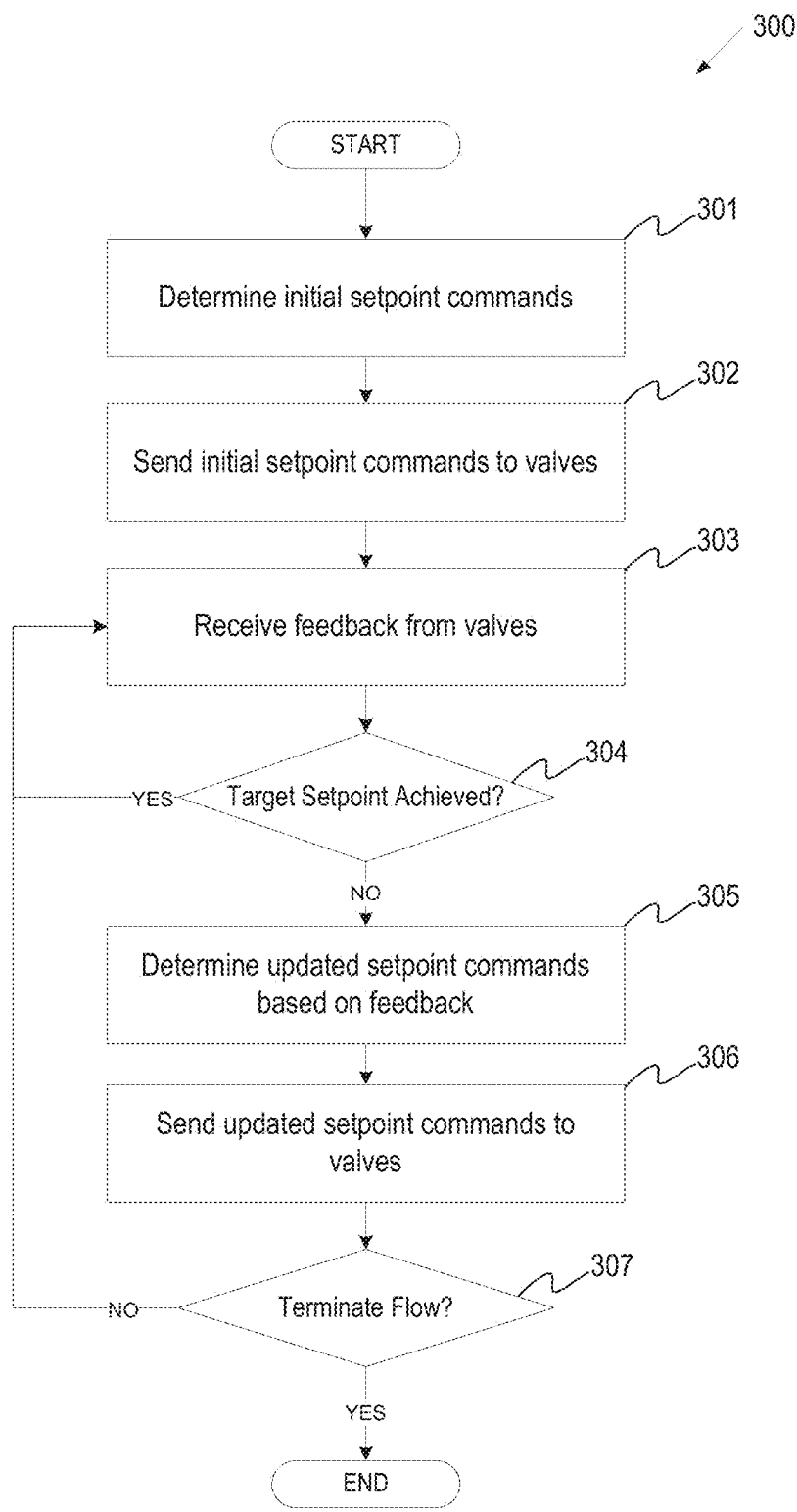
FIG. 3 is a flow diagram illustrating one embodiment of a method for feedback driven flow control.

FIG. 3 is a flow diagram illustrating one embodiment of a method 300 for feedback driven flow control. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by flow control module 115 of FIG. 1.

At block 301 of method 300, processing logic determines initial setpoint commands for the MFC 140 array. In one embodiment, this can be performed by target setpoint module 210 of FIG. 2. At block 302, processing logic sends the initial setpoints commands to the valves within the system. In one embodiment, a valve is a single MFC device in the MFC 140 array of FIG. 1. At block 303, processing logic receives feedback from the valves once the setpoint commands have been processed by each MFC in the MFC array.

At block 304, processing logic determines whether the target setpoint for each MFC has been achieved. If at block 304 processing logic determines that the target setpoint has been achieved, the method returns to block 303 to again receive feedback from the MFCs. If not, the method continues to block 305, and processing logic determines updated setpoint commands based on the feedback received in block 303. In one embodiment, block 305 can be performed by a combination of any or all of error module 215, total flow module 220, and update setpoint module 225 of FIG. 2.

At block 306, processing logic sends updated setpoint commands to the valves. In one embodiment, block 306 can be performed by update setpoint module 225 of FIG. 2, sending the commands as updated flow setpoint commands 240 of FIG. 2. At block 307, processing logic determines whether to terminate the flow. For example, a user can enter a command to terminate the flow, such as through user interface 105 of FIG. 1. If at block 307 processing logic determines that the flow should be terminated, the method ends. If not, the method returns to block 303 to again receive feedback from the MFCs.

Figure 4:
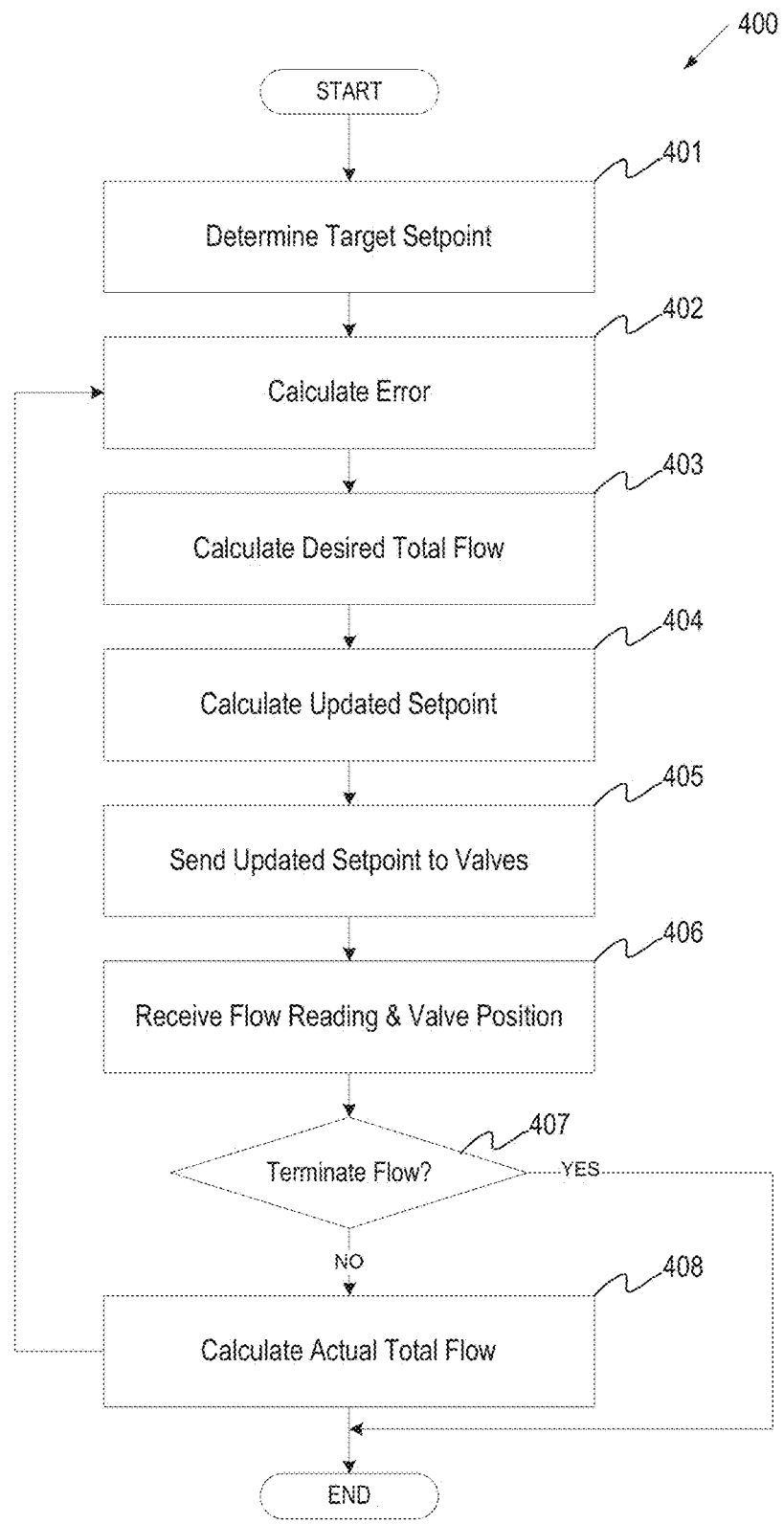
FIG. 4 is a flow diagram illustrating one embodiment of a method for determining flow control setpoints.

FIG. 4 is a flow diagram illustrating one embodiment of a method 400 for determining flow control setpoints. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by flow control module 115 of FIG. 1.

At block 401 of method 400, processing logic determines the target setpoint for each valve of an MFC array. In one embodiment, block 401 can be performed by target setpoint module 210 of FIG. 2. For example, the target setpoint module can utilize a setpoint representing the point at which a valve is as far open as possible and reduce that setpoint until a target reference threshold is achieved, where the target set point is a voltage represented as Vmax.

At block 402, processing logic calculates the total error value across the MFCs in the MFC array. In one embodiment, block 402 can be performed by error module 215 of FIG. 2. For example, the difference between the target voltage Vmax and an individual valve voltage of each MFC can be calculated as a value $dV_i = V_{imax} - V_i$, where i represents a particular MFC in the MFC array, Vimax represents the Vmax for that MFC, and Vi represents the actual voltage for that MFC. The Vimax values for the MFCs can be summed to determine a total error for the MFC array, which can be represented as e.

At block 403, processing logic calculates the desired total flow across the MFCs in the MFC array. In one embodiment, block 403 can be performed by total flow module 220 of FIG. 2. For example, a total gain across the MFCs in the MFC array can be represented as P, where the total gain is determined as a ratio of the total flow readings across the MFCs in the MFC array. The total flow of the MFCs in the MFC array can be represented as QRd. A desired total flow can be a product of QRd and the error e, where the desired total flow can be represented as Q-tot.

At block 404, processing logic calculates an updated setpoint for each of the MFCs in the MFC array. In one embodiment, block 404 can be performed by update setpoint module 225 of FIG. 2. For example, the desired total flow Q-tot from total flow module 220 can be multiplied with a pre-defined setpoint ratio for each MFC in the MFC array to determine an updated setpoint for each MFC.

At block 405, processing logic sends updated setpoint commands to the valves. In one embodiment, block 405 can be performed by update setpoint module 225 of FIG. 2, sending the commands as updated flow setpoint commands 240 of FIG. 2. At block 406, processing logic receives flow readings and valve positions for each MFC in the MFC array. At block 407, processing logic determines whether to terminate the flow. For example, a user can enter a command to terminate the flow, such as through front end system 105 of FIG. 1. If at block 407 processing logic determines that the flow should be terminated, the method ends. If not, the method continues to block 408 and processing logic calculates actual total flow across the MFCs in the MFC array. The method then returns to block 402 to repeat the process so long as flow has not been terminated.

Figure 5:
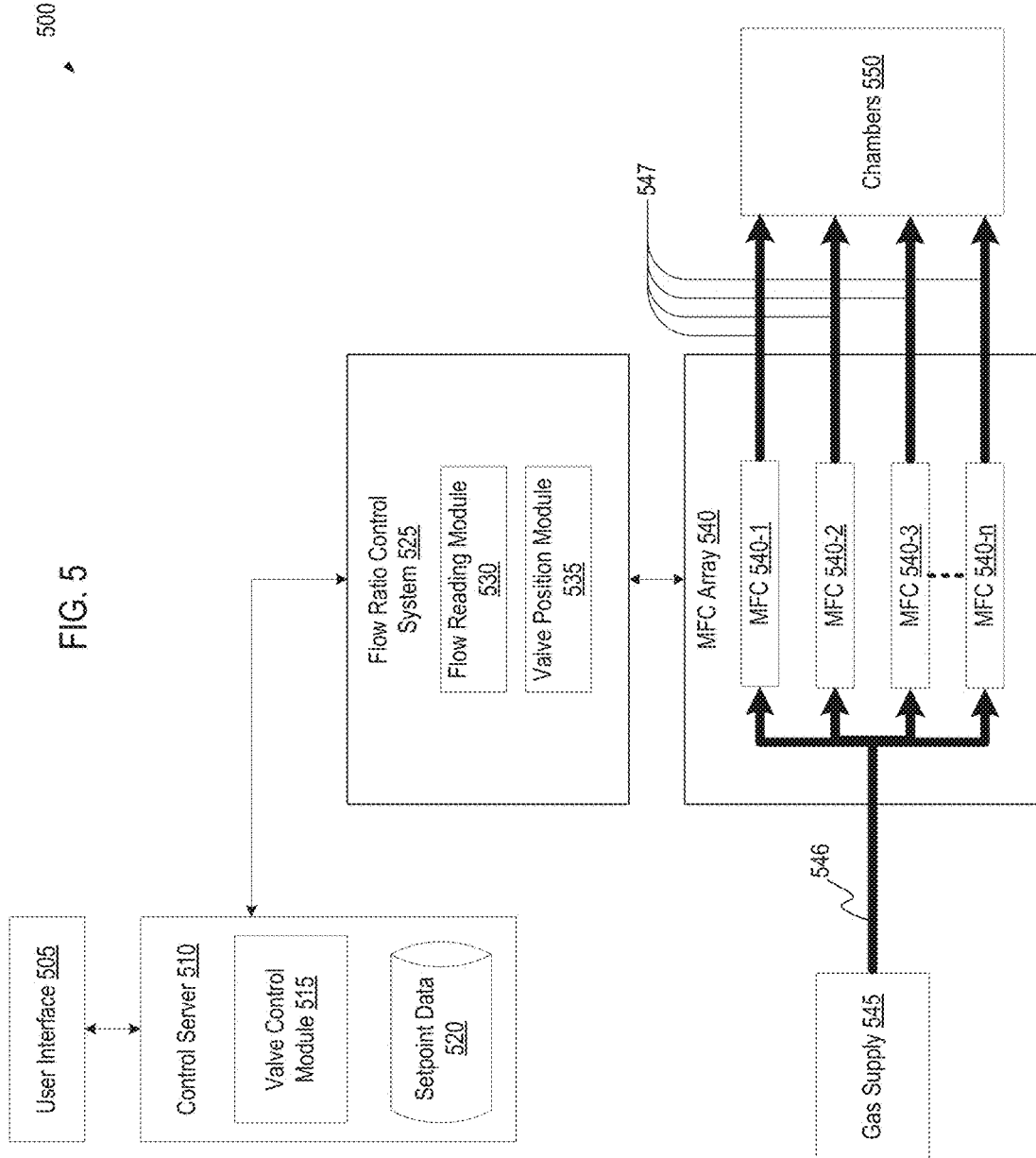
FIG. 5 is a block diagram illustrating a flow control system utilizing a feed-forward driven flow control module coupled to a multi-channel mass flow control apparatus via a high speed Ethercat connection in accordance with one embodiment of the present invention.

FIG. 5 is a block diagram illustrating a flow control system 500 utilizing a feed-forward driven flow control module coupled to a multi-channel mass flow control apparatus via a high speed Ethercat connection, in which embodiments described herein can operate. The flow control system 500 can include a user interface 505, a control server 510, and a flow ratio control system 525. The control server 510 can be coupled to the flow ratio control system 525 via a digital connection that provides high speed data transfer. Flow ratio control system 525 can be coupled to an array of mass flow controllers MFC 540-1 to MFC 540-n where n represents the total number of mass flow controllers in any embodiment. For example, in one embodiment the total number of mass flow controllers can be 2. In another embodiment, the total number of mass flow controllers can be 10. Each of the mass flow controllers in the MFC array 540 receive an input flow of gas 546 from gas supply 545 and produce an output flow 547 directed to chambers 550.

The user interface 505, control server 510, and flow ratio control system 525 can be individually hosted by any type of computing device including server computers, gateway computers, desktop computers, laptop computers, tablet computer, notebook computer, PDA (personal digital assistant), mobile communications devices, cell phones, smart phones, hand-held computers, or similar computing device. Alternatively, any combination of user interface 505, control server 510, and flow ratio control system 525 can be hosted on a single computing device including server computers, gateway computers, desktop computers, laptop computers, mobile communications devices, cell phones, smart phones, hand-held computers, or similar computing device.

User interface 505 can be variously configured with different functionality to enable a user to provide input to the control server 510. Additionally, the user interface 505 can be configured to provide information to a user regarding status of the control server 510. In one embodiment, the user interface 505 can display the desired total flow recipe, the current total flow readings, the individual errors for any MFC, the total error for the MFC array 540, or any combination thereof. In another embodiment, the user interface 505 can be used to terminate flow operations through the MFC array 540.

The control server 510 can implement resource intensive algorithms for monitoring information received from the flow ratio control system 525 in order to detect flow conditions present in the MFC array 540 that require an adjustment. In one embodiment, control server 510 can include a valve control module 515 and setpoint data 520.

The valve control module 515 can handle processing involved in making flow adjustments to the MFC array 540. In one embodiment, valve control module 515 can detect and correct flow instabilities in the MFC array 540. In another embodiment, valve control module 515 can make a flow adjustment to the MFC array 540 based on a command entered into the user interface 505.

In one embodiment, the valve control module 515 can send an initial setpoint command to each MFC via the flow ratio control system 525. The flow and valve voltage from each MFC can then be sent back to valve control module 515 where the flow is evaluated. If a flow instability is detected in the MFC array 540, valve control module 515 can predict valve or flow setpoints to correct the instability. Valve control module 515 can base the prediction on previous setpoints used in similar flow instability situations that are stored in a data store. In one embodiment the data store can be setpoint data 520. An updated setpoint can then be calculated for each MFC in the MFC array 540. The updated flow setpoint can then be sent directly to the flow ratio control system 525 via the high speed digital connection to adjust the individual MFCs in the MFC array 540.

In one embodiment, valve control module 515 can determine that a flow instability can be corrected with a specific change in the total flow setpoints for each MFC. In this situation, valve control module 515 can send fixed MFC flow setpoints directly to each MFC in the MFC array 540 across the digital connection, directly bypassing any feedback control. In another embodiment, valve control module 515 can determine that a flow instability can be corrected with a change in valve position for specific MFCs in the MFC array 540. In this situation, valve control module 515 can send valve position setpoints directly to the applicable MFCs in the MFC array 540. The valve control module 515 can utilize either or both of these two feed forward control modes to update only individual MFCs in the MFC array 540 or it can update the MFCs in the MFC array 540 at the same time.

The control server 510 can communicate with the flow ratio control system 525 via a high speed digital connection. In one embodiment this connection can be an Ethercat connection. The use of a digital connection can provide the ability to send and receive larger amounts of data and control measurements between control server 510 and flow ratio control system 525. Control server 510 can therefore communicate with flow ratio control system 525 much more quickly and with much greater accuracy.

The flow ratio control system 525 can handle processing involved in measurement of flow readings and valve positions of each of the MFCs in the MFC array 540. The flow ratio control system 525 can include a flow reading module 530 and a valve position module 535. In one embodiment, flow reading module 530 receives a valve voltage reading from each individual MFC in the MFC array 540 that is indicative of the total flow of that individual MFC. Flow reading module 530 then sends the total flow reading to real-time system 510 to be used in the valve control algorithm. The term "valve control algorithm" is intended to refer to the processing logic that is responsible for maintaining a predetermined valve voltage "recipe." In one embodiment, valve position module 535 receives a voltage reading from each MFC in the MFC array 540 that is indicative of the valve position of that individual MFC. Valve position module 535 then sends the valve position reading to real-time system 510 to be used in the valve control algorithm.

Additionally, flow ratio control system 525 can send updated setpoint commands to each of the MFCs in the MFC array 540. If valve control module 515 determines that a change in flow is required, control server 510 can send updated flow setpoint commands to the MFC array 540 via flow ratio control system 525. Similarly, if valve control module 515 determines that a change in valve position is required, control server 510 can send updated valve position setpoint commands to the MFC array 540 via flow control ratio system 525.

Figure 6:
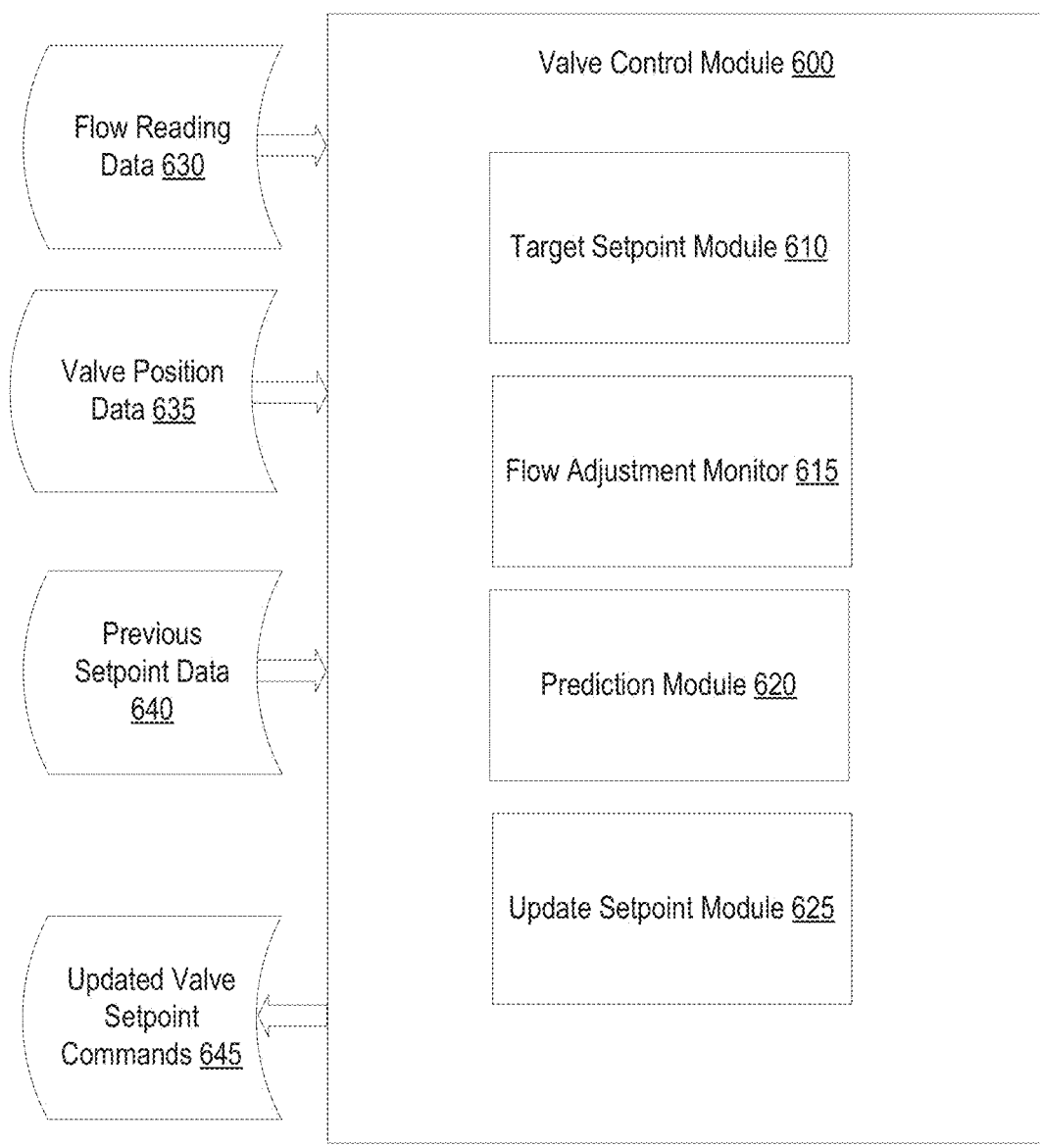
FIG. 6 is a block diagram of one embodiment of valve control module.

FIG. 6 is a block diagram of one embodiment of a valve control module 600, which can correspond to the valve control module 515 of FIG. 1. The valve control module 600 can include one or more of a target setpoint module 610, a flow adjustment monitor 615, a prediction module 620, and an update setpoint module 625. Additionally, valve control module 600 can receive flow reading data 630, valve position data 635, and previous setpoint data 640, as well as transmit updated flow setpoint commands 640.

Target setpoint module 610 is configured to determine the reference threshold for valve voltage for each MFC of the MFC array. The reference threshold represents the target valve voltage to which each MFC valve can be driven so that pressure drops are minimized during transient flows. In one embodiment, the target setpoint module 610 utilizes the setpoint representing the point at which a valve is as far open as possible and reduces that setpoint until the target reference threshold is achieved.

Flow adjustment monitor 615 is configured to monitor the flow across the MFC array and determine if there are any adjustments required. In one embodiment, flow adjustment monitor 615 can receive updated setpoint commands from user interface 505 of FIG. 5. In another embodiment, flow adjustment monitor 615 can monitor the MFC array for instabilities in the transient flow in any or all of the MFCs. In one embodiment, flow instability module 615 can detect an instability based on calculating the error as described above in error module 215 of FIG. 2. In another embodiment, flow adjustment monitor 615 can detect an instability based on calculating the gain using the total flow readings across the MFCs in the MFC array as described above in total flow module 220 of FIG. 2. In embodiments, flow adjustment monitor 615 can use flow reading data 630 and/or valve position data 635 in order to determine whether a flow instability is present in the MFC array.

Prediction module 620 is configured to generate corrected valve or flow setpoints based on flow adjustments detected by flow adjustment monitor 615. In one embodiment, prediction module 620 can receive correction setpoints directly via user input through the user interface 505 of FIG. 5. In another embodiment, prediction module 620 can predict updated setpoints based on user input. For example, if a user enters updated setpoints into a user interface, prediction module 620 can generate a prediction of the most efficient flow or valve setpoint values based on previously entered setpoints where a more efficient flow was achieved. Prediction module 620 can search a database of stored setpoints to determine if a substantially similar set of setpoints was ever entered in the past and if those setpoints led to a flow instability. Prediction module 620 can then generate a new set of setpoints that are likely to avoid an inefficient flow condition.

In another embodiment, prediction module 620 can predict possible valve or flow setpoints to correct any instability detected by flow adjustment monitor 615. If a flow instability is detected, prediction module 620 can receive previous setpoint data 640 from a database of stored setpoints such as can be found in setpoint data 520 of FIG. 5. Prediction module 620 can search stored setpoints to determine if the currently detected flow instability (or a substantially similar flow instability) has occurred in the system at a prior time. If so, prediction module 620 will receive the setpoints utilized by the system to correct the prior flow instability in order to attempt to correct the currently detected flow instability.

Alternatively, if the conditions of the current flow instability have not been encountered before in the system, prediction module 620 can search for an instability condition that was similar to the current flow instability. In one embodiment, prediction module 620 can use a configurable threshold limit by which any previously encountered flow instability condition can be considered similar enough to the current flow instability to be useful in predicting a possible correction. For example, one embodiment can compare total flow voltage of the current instability condition to the total flow voltage of saved instability data. If the two are not the same, but are within a predetermined voltage threshold of each other, prediction module 620 can determine that the two are similar enough such that the setpoints for the stored data can be useful in predicting a correction for the current problem.

Update setpoint module 625 is configured to determine a new setpoint for each MFC in the MFC array based on the prediction generated by prediction module 620. In one embodiment, update setpoint module 625 can send the updated setpoints directly to the MFCs in the MFC array as updated flow setpoint commands 645.

Figure 7:
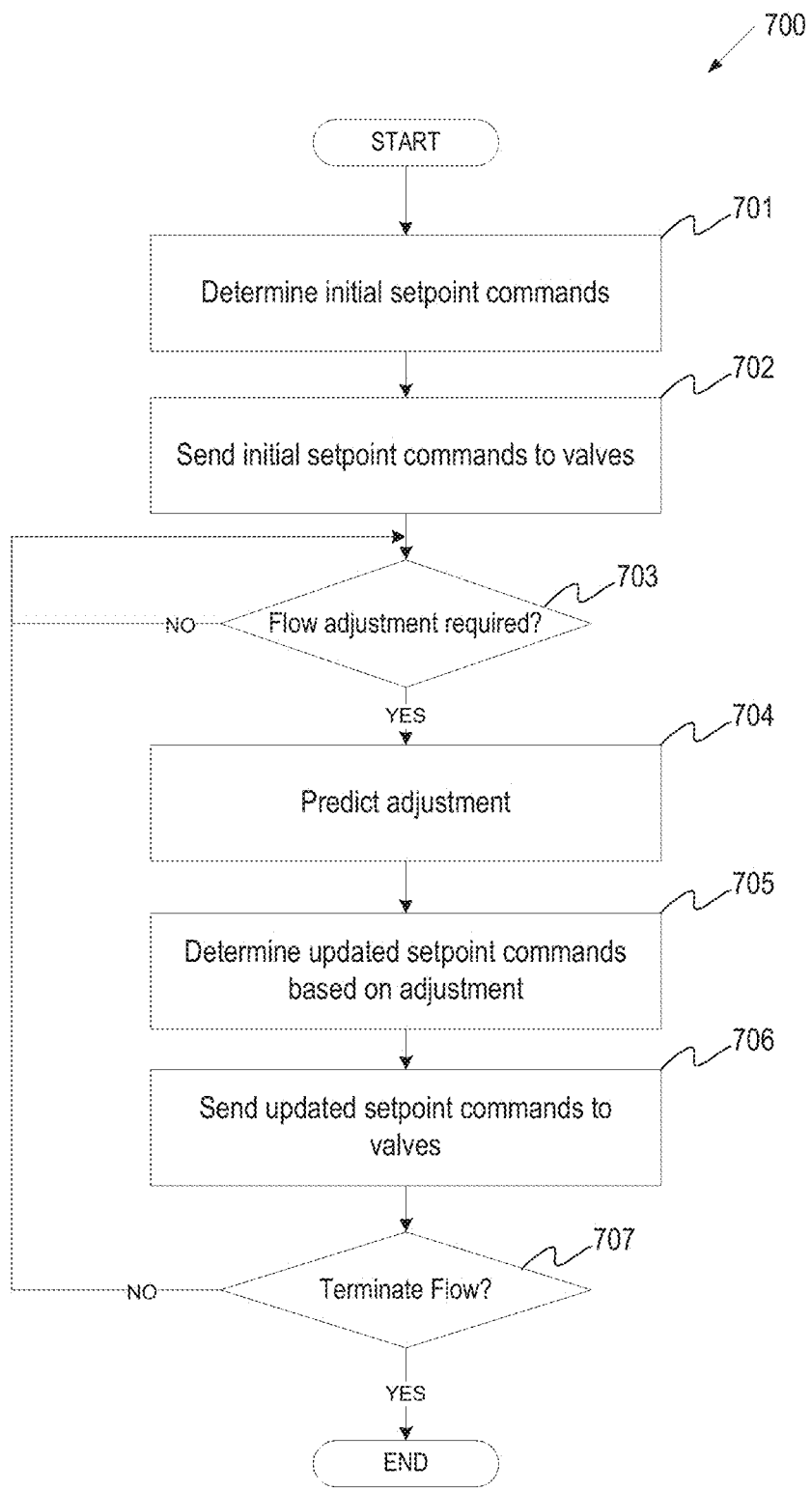
FIG. 7 is a flow diagram illustrating one embodiment of a method for feed-forward driven flow control.

FIG. 7 is a flow diagram illustrating one embodiment of a method 700 for feed-forward driven flow control. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by valve control module 515 of FIG. 5.

At block 701 of method 700, processing logic determines initial setpoint commands for the MFC array. In one embodiment, this can be performed by target setpoint module 610 of FIG. 6. At block 702, processing logic sends the initial setpoint commands to the valves within the system. In one embodiment, a valve is an MFC device in the MFC 540 array of FIG. 5. At block 703, processing logic determines whether a flow adjustment is required. For example, in one embodiment, whether a flow instability has been detected in the system is determined. In another embodiment, whether new setpoint commands have been entered into a user interface can be determined. If a flow adjustment is not required, processing logic continues to monitor the system for flow adjustments. If processing logic determines that a flow adjustment is required, the method continues to block 704, and processing logic predicts an adjustment. For example, if a flow instability is detected, a correction to the flow instability can be predicted. Similarly, if a user enters updated setpoint commands into a user interface that can lead to a flow instability, a correction to the user entered setpoints in order to avoid the flow instability can be determined. In one embodiment, block 704 can be performed by prediction module 620 of FIG. 6.

At block 705, processing logic determines updated setpoint commands based on the adjustment predicted at block 704. In one embodiment, block 705 can be performed by update setpoint module 625 of FIG. 6. At block 706, processing logic sends updated setpoint commands to the valves. In an embodiment, block 706 can be performed by update setpoint module 625 of FIG. 6, sending the commands as updated valve setpoint commands 645.

At block 707, processing logic determines whether to terminate the flow. For example, a user can enter a command to terminate the flow, such as through front end system 505 of FIG. 5. If at block 707 processing logic determines that the flow should be terminated, the method ends. If not, the method returns to block 703 to again check for flow instabilities in the system.

Figure 8:
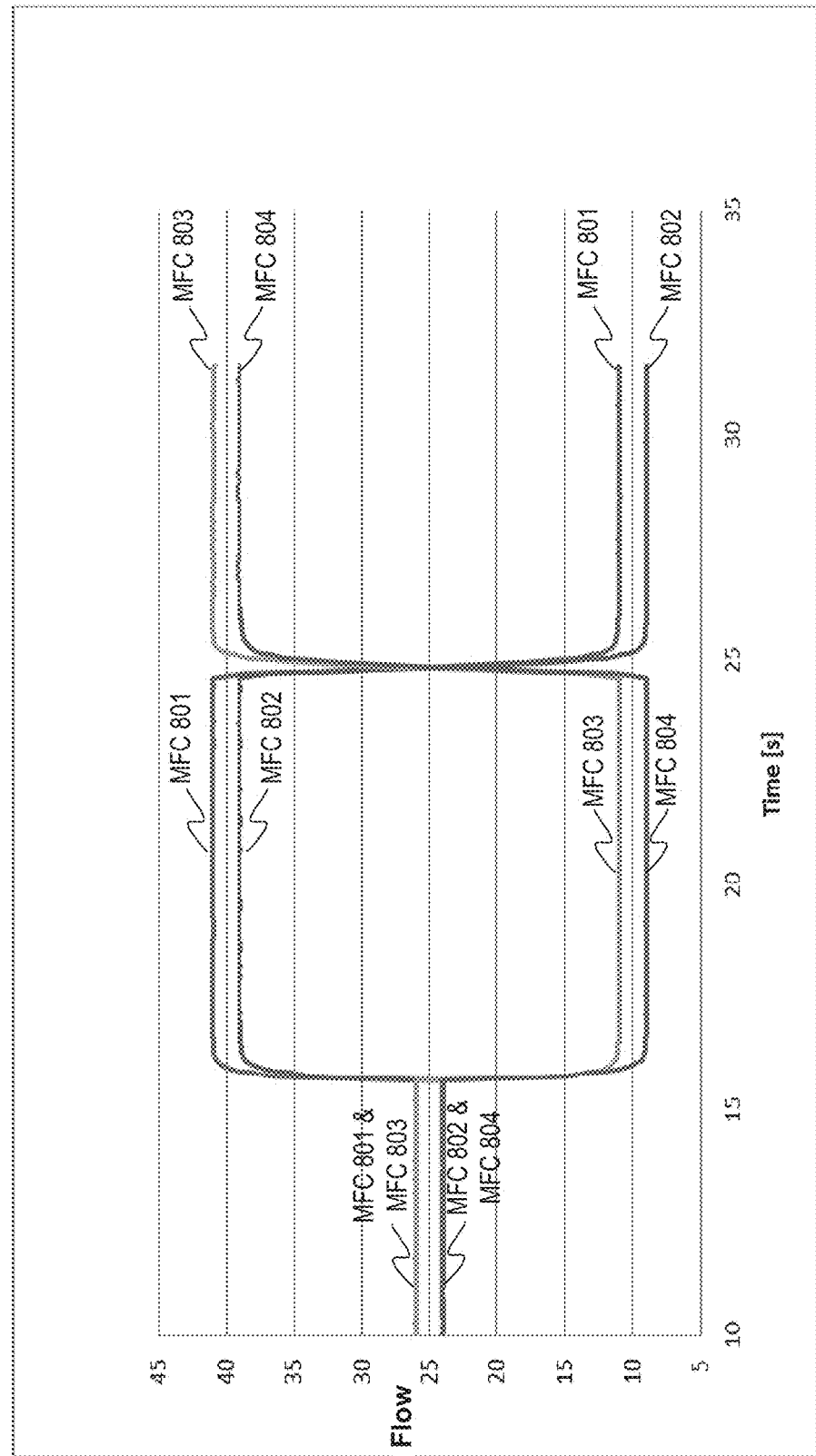
FIG. 8 illustrates a graphical representation of a flow transient for a four-channel flow ratio controller using four MFC devices, in accordance with one embodiment of the present invention.

FIG. 8 illustrates a graphical representation of a flow transient for a four-channel flow ratio controller using four MFC devices, in accordance with one embodiment of the present invention. In one embodiment, MFC 801, MFC 802, MFC 803, and MFC 804 can be MFC 140-1 through MFC 140-n of FIG. 1.

At time mark 10 seconds, MFC 801 and MFC 803 are each set to a flow ratio of 26% and MFC 802 and MFC 804 are each set to a flow ration of 24%. The MFCs remain at these setpoints until approximately time mark 16, where new setpoints are entered into the system. For example, a user can enter new target setpoints into the front end system 105 of FIG. 1. At time 16, the flow control algorithm begins to iteratively calculate updated setpoints and send them to each of the four MFCs in the array. In one embodiment, the flow control algorithm can be performed by flow control module 115 of FIG. 1. Each of the four MFCs are symmetrically adjusted until the desired flow is attained without incurring spikes in the total flow. At an approximate time mark of 17 seconds, MFC 801 has been updated to a flow of 41%, MFC 802 to a flow of 39%, MFC 803 to a flow of 11%, and MFC 804 to a flow of 9%.

At an approximate time mark of 24 seconds the setpoints are updated again, driving the four MFCs to new a new desired flow. At an approximate time of 26 seconds, MFC 803 has been updated to a flow of 41%, MFC 804 to a flow of 39%, MFC 801 to a flow of 11%, and MFC 802 to a flow of 9%.

Note that FIG. 8 describes an embodiment with four channels. However, according to embodiments, MFC arrays can contain fewer than four channels or more than four channels.

Figure 9:
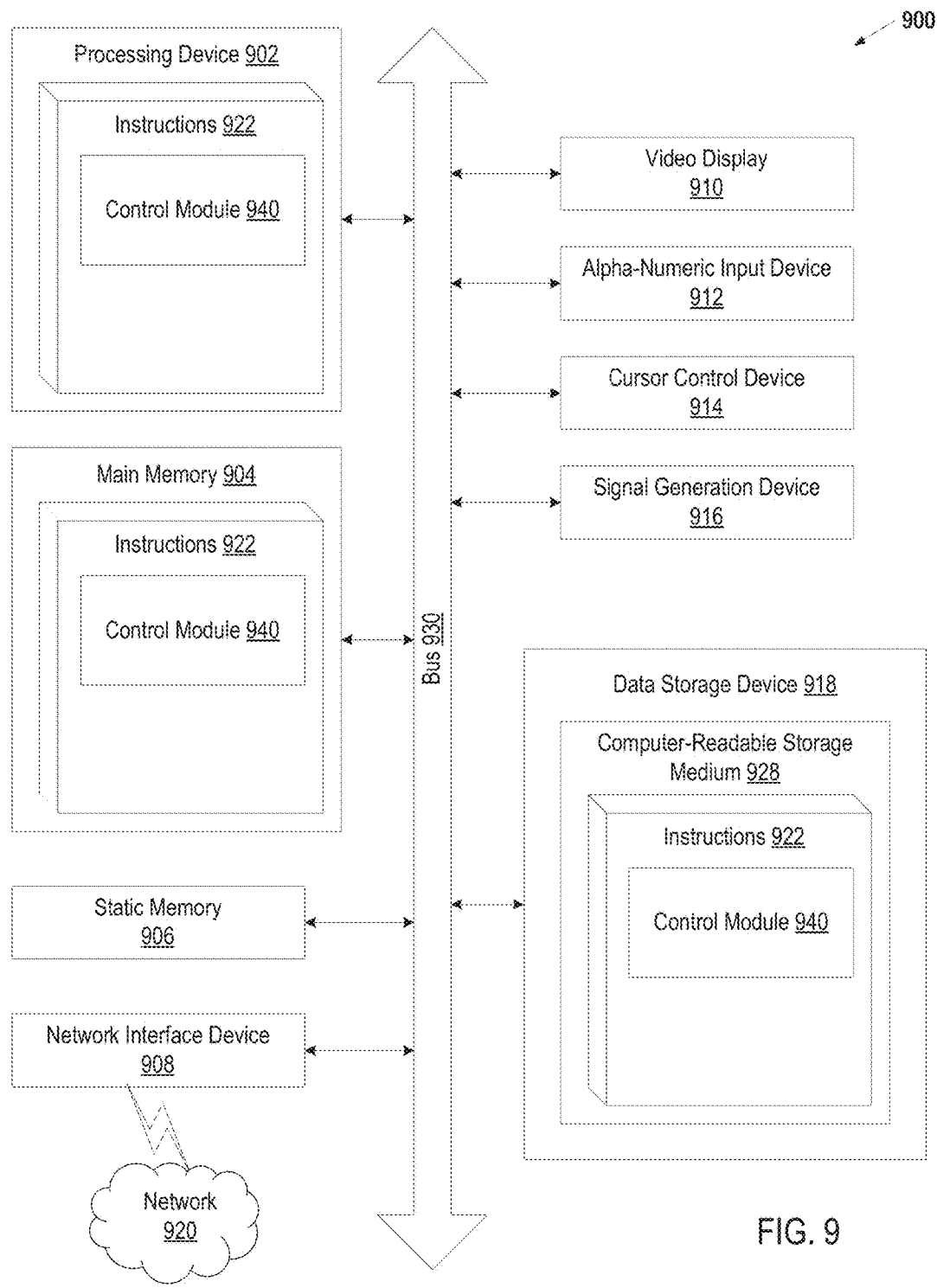
FIG. 9 illustrates a block diagram of a computer system that can perform one or more of the operations described herein.

FIG. 9 is a block diagram illustrating an example computing device 900. In one embodiment, the computing device corresponds to a computing device hosting a control module 940. In one embodiment, the control module 940 can be the flow control module 115 of FIG. 1. In another embodiment, the control module 940 can be the valve control module 515 of FIG. 5. The computing device 900 includes a set of instructions for causing the machine to perform any one or more of the methodologies discussed herein. In alternative embodiments, the machine can be connected (e.g., networked) to other machines in a LAN, an intranet, an extranet, or the Internet. The machine can operate in the capacity of a server machine in client-server network environment. The machine can be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer device 900 includes a processing system (processing device) 902, a main memory 904 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device 902 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 can also be one or more special-purpose processing devices such as an application specific integrated circuit (ASIC), a field programmable gate array (FPGA), a digital signal processor (DSP), network processor, or the like. The processing device 902 is configured to execute the control module 940 for performing the operations and steps discussed herein.

The computing device 900 can further include a network interface device 908. The computing device 900 also can include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 can include a computer-readable storage medium 928 on which is stored one or more sets of instructions (instructions of control module 940) embodying any one or more of the methodologies or functions described herein. The control module 940 can also reside, completely or at least partially, within the main memory 904 and/or within the processing device 902 during execution thereof by the computing device 900, the main memory 904 and the processing device 902 also constituting computer-readable media. The control module 940 can further be transmitted or received over a network 920 via the network interface device 908.

While the computer-readable storage medium 928 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the disclosure can be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "adding," "providing," or the like, refer to the actions and processes of a computing device, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the disclosure also relate to an apparatus for performing the operations herein. This apparatus can be specially constructed for the required purposes, or it can comprise a general purpose computer selectively activated or reconfigured by a computer program stored in the computer. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   sending a first plurality of setpoint commands to a plurality of valves;
   receiving user input to update the first plurality of setpoint commands;
   identifying, prior to detecting an unstable flow condition, a previous set of setpoint commands that is substantially similar to the updated first plurality of setpoint commands;
   determining whether the previous set of setpoint commands that is substantially similar to the updated first plurality of setpoint commands caused a prior unstable flow condition;
   if the previous set of setpoint commands caused the prior unstable flow condition, predicting, for each of the plurality of valves, a flow adjustment based on a second plurality of setpoint commands associated with a corrective action taken to correct the prior unstable flow condition, wherein the corrective action corresponds to a change in valve position that results in stable mass flow;
   determining, by a processing device, a third plurality of setpoint commands, each of the third plurality of setpoint commands corresponding to one of the plurality of valves, based on the predicted flow adjustment; and
   symmetrically sending each of the third plurality of setpoint commands to the corresponding one of the plurality of valves to avoid the unstable flow condition, wherein the third plurality of setpoint commands are sent to bypass feedback control of a feedback-driven flow control system operatively coupled to the plurality of valves.

2. The method of claim 1, wherein each of the first, second, and third plurality of setpoint commands comprises at least one of a flow setpoint or a valve position setpoint.

3. The method of claim 1, wherein the unstable flow condition comprises an inefficient flow condition.

4. The method of claim 1, wherein each of the first plurality of setpoint commands is based on a corresponding flow percentage, an initial total flow, and a corresponding initial valve voltage.

5. The method of claim 1, wherein each of the plurality of valves comprises a respective mass flow controller.

6. The method of claim 1, wherein the unstable flow condition comprises a non-symmetrical change in flow across the plurality of valves.

7. The method of claim 1, wherein the second plurality of setpoint commands comprise a plurality of stored setpoint commands recorded during prior stable flow conditions.

8. A system comprising:
   a processing device to:
      send a first plurality of setpoint commands to a plurality of valves;
      receive user input to update the first plurality of setpoint commands;

identify, prior to detecting an unstable flow condition, a previous set of setpoint commands that is substantially similar to the updated first plurality of setpoint commands;

determine whether the previous set of setpoint commands that is substantially similar to the updated first plurality of setpoint commands caused a prior unstable flow condition, wherein the corrective action corresponds to a change in valve position that results in stable mass flow;

if the previous set of setpoint commands caused the prior unstable flow condition, predict, for each of the plurality of valves, a flow adjustment based on a second plurality of setpoint commands associated with a corrective action taken to correct the prior unstable flow condition;

determine a third plurality of setpoint commands, each of the third plurality of setpoint commands corresponding to one of the plurality of valves, based on the predicted flow adjustment; and symmetrically send each of the third plurality of setpoint commands to the corresponding one of the plurality of valves to avoid the unstable flow condition, wherein the third plurality of setpoint commands are sent to bypass feedback control of a feedback-driven flow control system operatively coupled to the plurality of valves.

9. The system of claim 8, wherein each of the first, second, and third plurality of setpoint commands comprises at least one of a flow setpoint or a valve position setpoint.

10. The system of claim 8, wherein each adjustment of the plurality of valves comprises at least one of a flow setpoint or a valve position setpoint.

11. The system of claim 8, wherein each of the first plurality of setpoint commands is based on a corresponding flow percentage, an initial total flow, and a corresponding initial valve voltage.

12. The system of claim 8, wherein each of the plurality of valves comprises a respective mass flow controller.

13. The system of claim 8, wherein the unstable flow condition comprises a non-symmetrical change in flow across the plurality of valves.

14. The system of claim 8, wherein the second plurality of setpoint commands comprise a plurality of stored setpoint commands recorded during prior stable flow conditions.

15. A non-transitory computer readable medium having instructions that, when executed by a processing device, cause the processing device to perform a method comprising:

sending a first plurality of setpoint commands to a plurality of valves;

receiving user input to update the first plurality of setpoint commands;

identifying, prior to detecting an unstable flow condition, a previous set of setpoint commands that is substantially similar to the updated first plurality of setpoint commands;

determining whether the previous set of setpoint commands that is substantially similar to the updated first plurality of setpoint commands caused a prior unstable flow condition;

if the previous set of setpoint commands caused the unstable flow condition, predicting, for each of the plurality of valves, flow adjustment based on a second plurality of setpoint commands associated with a corrective action taken to correct the prior unstable flow condition, wherein the corrective action corresponds to a change in valve position that results in stable mass flow;

determining, by a processing device, a third plurality of setpoint commands, each of the third plurality of setpoint commands corresponding to one of the plurality of valves, based on the predicted adjustment; and symmetrically sending each of the third plurality of setpoint commands to the corresponding valve to avoid the unstable flow condition, wherein the third plurality of setpoint commands are sent to bypass feedback control of a feedback-driven flow control system operatively coupled to the plurality of valves.

16. The non-transitory computer readable medium of claim 15, wherein each of the first, second, and third plurality of setpoint commands comprises at least one of a flow setpoint or a valve position setpoint.

17. The non-transitory computer readable medium of claim 15, wherein the unstable flow condition comprises an inefficient flow condition.

18. The non-transitory computer readable medium of claim 15, wherein each of the first plurality of setpoint commands is based on a corresponding flow percentage, an initial total flow, and a corresponding initial valve voltage.

19. The non-transitory computer readable medium of claim 15, wherein the unstable flow condition comprises a non-symmetrical change in flow across the plurality of valves.

20. The non-transitory computer readable medium of claim 15, wherein the second plurality of setpoint commands comprise a plurality of stored setpoint commands recorded during prior stable flow conditions.

* * * * *